United States Patent [19]

Breton et al.

[11] Patent Number: 5,254,158
[45] Date of Patent: Oct. 19, 1993

[54] INK JET INK COMPOSITIONS

[75] Inventors: Marcel P. Breton, Mississauga; Geoffrey A. R. Nobes, Kitchener; Barbel Helbrecht, Oakville; Shadi L. Malhotra, Mississauga, all of Canada

[73] Assignee: Xerox Corporation, Stamford, Conn.

[21] Appl. No.: 946,213

[22] Filed: Sep. 17, 1992

[51] Int. Cl.$^5$ .............................................. C09D 11/02
[52] U.S. Cl. .................................. 106/20 R; 106/22 R
[58] Field of Search ............... 106/20 R, 22 R, 22 H, 106/20 D

[56] References Cited

U.S. PATENT DOCUMENTS

| | | | |
|---|---|---|---|
| 3,477,862 | 11/1969 | Forsyth, Jr. | 106/22 R |
| 4,014,833 | 3/1977 | Story | 106/20 R |
| 4,184,881 | 1/1980 | Bradley | 106/20 B |
| 4,337,183 | 6/1982 | Santiago | 524/446 |
| 4,395,288 | 7/1983 | Eida et al. | 106/22 K |
| 4,431,450 | 2/1984 | Hasegawa et al. | 106/23 R |
| 4,508,570 | 4/1985 | Fujii et al. | 106/20 D |
| 4,525,216 | 6/1985 | Nakanishi | 106/23 B |
| 4,597,794 | 7/1986 | Ohta et al. | 106/20 C |
| 4,680,332 | 7/1987 | Hair et al. | 524/377 |
| 4,705,567 | 11/1987 | Hair et al. | 106/20 D |
| 4,986,850 | 1/1991 | Iwata et al. | 106/22 F |
| 5,059,244 | 10/1991 | King et al. | 106/20 B |
| 5,106,417 | 4/1992 | Hauser et al. | 106/499 |
| 5,180,425 | 1/1993 | Matrick et al. | 106/499 |
| 5,211,747 | 5/1993 | Breton et al. | 106/20 R |

FOREIGN PATENT DOCUMENTS

| | | |
|---|---|---|
| 106273 | 8/1980 | Japan . |
| 120771 | 6/1985 | Japan . |
| 010547 | 3/1987 | Japan . |
| 101672 | 5/1987 | Japan . |
| 186782 | 8/1988 | Japan . |
| 234073 | 9/1988 | Japan . |
| 063879 | 2/1992 | Japan . |
| 1212883 | 11/1970 | United Kingdom . |

Primary Examiner—Helene Klemanski
Attorney, Agent, or Firm—Judith L. Byorick

[57] ABSTRACT

Disclosed is an ink composition which comprises an aqueous liquid vehicle, a colorant, and an additive material selected from the group consisting of amine alkoxylates, sorbitan monoester alkoxylates, alkylene oxide adducts of glycerine, and mixtures thereof.

5 Claims, No Drawings

INK JET INK COMPOSITIONS

BACKGROUND OF THE INVENTION

The present invention is directed to ink compositions. More specifically, the present invention is directed to ink compositions particularly suitable for ink jet printing which contain one or more compounds selected from the group consisting of amine alkoxylates, sorbitan monoester alkoxylates, alkylene oxide adducts of glycerine, and mixtures thereof. One embodiment of the present invention is directed to an ink composition which comprises an aqueous liquid vehicle, a colorant, and an additive material selected from the group consisting of amine alkoxylates, sorbitan monoester alkoxylates, alkylene oxide adducts of glycerine, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enabled the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. For example, U.S. Pat. No. 4,184,881 (Bradley) discloses an ink composition for use in ink jet printing comprising an aqueous solution of a water soluble dye and a humectant consisting of ethylene oxide adducts of at least one acetylenic diol in the absence of any glycol or glycol ether. In addition, U.S. Pat. No. 4,337,183 (Santiago) discloses an aqueous printing ink composition which comprises a physical mixture of polyurethane resin, polyethylene resin, and water as the vehicle. The invention provides a family of water based inks with enhanced physical and mechanical properties, superior abrasion resistance, and good adhesion to various substrates. Further, U.S. Pat. No. 3,477,862 (Forsyth) discloses an ink comprising a dyestuff, a solution of high molecular weight polyethylene oxide and glycerin for employment in a pen, nozzle or other ink applying means to ensure the inscription of a clear continuous solid line on a chart on which the ink applying means is associated as the ink applying means traverses the chart.

Heterophase ink jet inks are also known. For example, U.S. Pat. No. 4,014,833 (Story) discloses a composition and method for improving the ink transfer properties of aqueous printing inks. The composition is an aqueous ink containing from 0.1 to 1.5 percent by weight of a polyethylene oxide resin having a molecular weight in the range of from 100,000 to 350,000. In addition, U.S. Pat. NO. 4,680,332 (Hair et al.) discloses a heterophase ink composition which comprises a water insoluble polymer dispersed in a liquid medium, the polymer containing therein an oil soluble dye, and a nonionic stabilizer permanently attached thereto. The polymer may include styrene, parachlorostyrene, vinyl naphthalene, and acrylates wherein the carbon chain length is from about 1 to about 18 carbon atoms. The stabilizers may include ethylene oxide and propylene oxide block copolymers. Further, U.S. Pat. No. 4,705,567 (Hair et al.) discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 (Ohta et al.) discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

Copending application U.S. Ser. No. 07/701,242, with the named inventors Marcel P. Breton, Melvin D. Croucher, Kerstin M. Henseleit, Barbel Helbrecht, and Fatima M. Pontes, entitled "Ink for Ink Jet Printing," filed May 16, 1991, the disclosure of which is totally incorporated herein by reference, discloses an ink composition which comprises an ink vehicle, a colorant, and at least one member selected from the group consisting of a polyalkyleneimine/alkylene oxide block copolymer and a primary or secondary polyoxyalkyleneimine.

Although known compositions and processes are suitable for their intended purposes, a need remains for ink compositions suitable for ink jet printing which enable rapid drying times. In addition, a need exists for ink compositons suitable for ink jet printing which enable rapid drying times without lost line edge quality when printed on plain papers. Further, there is a need for ink compositions suitable for ink jet printing which enable improved print quality. Additionally, there is a need for ink compositions suitable for ink jet printing which exhibit desirable surface tension characteristics. There is also a need for ink compositions suitable for ink jet printing which exhibit desirable latency characteristics. (Latency is a measure of the amount of time at a particular humidity level for which the flow of ink through an ink jet nozzle can be stopped and later started without clogging.) Further, there is a need for ink compositions suitable for ink jet printing which exhibit desirable viscosity characteristics. Additionally, there is a need for ink compositions suitable for ink jet printing which exhibit desirable waterfastness characteristics.

SUMMARY OF THE INVENTION

It is an object of the present invention to provide ink compositions and ink jet printing processes with the above advantages.

It is another object of the present invention to provide ink compositions and ink jet printing processes with rapid drying times.

It is yet another object of the present invention to provide ink compositions suitable for ink jet printing which enable rapid drying times without lost line edge quality when printed on plain papers.

It is still another object of the present invention to provide ink compositions suitable for ink jet printing which enable improved print quality.

Another object of the present invention is to provide ink compositions suitable for ink jet printing which exhibit desirable surface tension characteristics.

Yet another object of the present invention is to provide ink compositions suitable for ink jet printing which exhibit desirable latency characteristics.

Still another object of the present invention is to provide ink compositions suitable for ink jet printing which exhibit desirable viscosity characteristics.

It is another object of the present invention to provide ink compositions suitable for ink jet printing which exhibit desirable waterfastness characteristics.

These and other objects of the present invention (or specific embodiments thereof) can be achieved by providing an ink composition which comprises an aqueous liquid vehicle, a colorant, and an additive material selected from the group consisting of amine alkoxylates, sorbitan monoester alkoxylates, alkylene oxide adducts of glycerine, and mixtures thereof. Another embodiment of the present invention is directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range. In a particularly preferred embodiment of the present invention, the liquid vehicle comprises a mixture of water, sulfolane, and 2-pyrrolidinone or N-methyl pyrrolidinone; preferably, the liquid vehicle comprises water in an amount of from about 80 to about 90 parts by weight, sulfolane in an amount of from about 5 to about 10 parts by weight, and 2-pyrrolidinone or N-methyl pyrrolidinone in an amount of from about 5 to about 10 parts by weight, although the relative amounts can be outside this range.

Inks of the present invention contain a colorant. Generally, the colorant is a dye, preferably an anionic dye. Any suitable anionic dye may be employed, with the term "anionic dye" referring to a dye wherein the molecular structure of the chromophore contains at least one anionic site. Examples of suitable anionic dyes include reactive dyes and direct dyes. Specific examples include Bernacid Red 2BMN, Pontamine Brilliant Bond Blue A, BASF X-34, Pontanmine, Food Black 2, Carodirect Turquoise FBL supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red CBH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion, Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue HGF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8G, Intracron Turquoise Blue GE, Intracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4'-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight, although the amount can be outside of this range.

The ink compositions of the present invention also contain an additive material selected from the group consisting of amine alkoxylates, sorbitan monoester alkoxylates, alkylene oxide adducts of glycerine, and mixtures thereof.

Suitable amine alkoxylates for the inks of the present invention generally are of the formula:

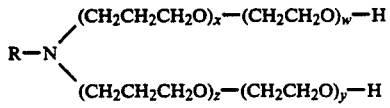

wherein the sum of w+y is from about 12 to about 50, preferably from about 12 to about 24, and more preferably about 12, and the sum of x+z is from 0 to about 25, preferably from 0 to about 12, and more preferably from 0 to about 6, wherein the ratio of w segments to x segments and the ratio of y segments to z segments are each from 100:0 to about 50:50, and wherein R is an alkyl group (preferably linear but R may also be branched) with from about 4 to about 18 carbon atoms, preferably from about 8 to about 18 carbon atoms. Materials of this formula are commercially available, such as Alkaminox T-12, available from Alkaril Chemicals, Ltd., Mississauga, Ontario. The amine ethoxylate can be present in the ink composition in any effective amount, typically from about 0.01 to about 5.0 percent by weight of the ink, and preferably from about 0.15 to about 4.2 percent by weight of the ink, although the amount can be outside these ranges. In a particularly preferred embodiment, the ink also contains ethylene glycol in an amount of from about 15 to about 20 percent by weight.

Suitable sorbitan monoester alkoxylates for the inks of the present invention generally are of the formula:

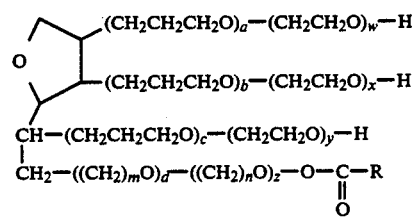

wherein the sum of w+x+y+z is from about 10 to about 25, and more preferably about 20, the sum of a+b+c+d is from 0 to about 12, with a being less than 3, b being less than 3, c being less than 3, and d being less than 3, m is 2 or 3, and n is 2 or 3, with the sum of m+n being 5, wherein the ratio of w segments to a segments, the ratio of x segments to b segments, the ratio of y segments to c segments, and the ratio of z segments to d segments are each from 100:0 to about 50:50, and wherein R is an alkyl group (preferably linear but R may also be branched) with from about 1 to about 18 carbon atoms, preferably from about 4 to about 18 carbon atoms. Materials of this formula are commercially available, such as Alkamuls PSMO-20, available from Alkaril Chemicals, Ltd., Mississauga, Ontario. The sorbitan monoester ethoxylate can be present in the ink composition in any effective amount, typically from about 0.01 to about 2 percent by weight of the ink, and preferably from about 0.05 to about 1.25 percent by weight of the ink, although the amount can be outside these ranges. In a particularly preferred embodiment, the ink also contains ethylene glycol in an amount of from about 10 to about 25 percent by weight.

Suitable alkylene oxide adducts of glycerine for the inks of the present invention generally are of the formula:

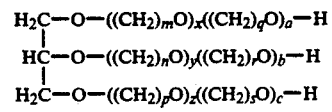

wherein m, n, p, q, r, and s are each either 2 or 3, and wherein x, y, z, a, b, and c are each from 0 to about 25, and preferably from 0 to about 10, wherein at least one member of the group consisting of x, y, z, a, b, and c is equal to 1 or greater.

Materials of this formula are commercially available, such as Liponic EG-1 (also called Glycereth-26), a material of the above formula wherein m, n, p, q, r, and s are each 2, containing 26 ethylene oxide (EO) units and having a hydroxyl value of from about 128 to about 138, Liponic EG-7 (also called Glycereth-7), a material of the above formula wherein m, n, p, q, r, and s are each 2, containing 7 ethylene oxide (EO) units and having a hydroxyl value of from about 412 to about 428, all available from LiPO Chemicals, Inc., Paterson, N.J. The ethylene oxide adduct of glycerine can be present in the ink composition in any effective amount, typically from about 0.1 to about 30 percent by weight of the ink, and preferably from about 1 to about 15 percent by weight of the ink, although the amount can be outside these ranges. In a particularly preferred embodiment, the ink employs the ethylene oxide adduct of glycerine as a portion of the total humectant content of the ink, and the amount of the ethylene oxide adduct of glycerine present in the ink is from about 5 to about 50 percent by weight of the total humectant concentration.

When mixtures of two or more materials of the above formulae are incorporated into an ink of the present invention, the total amount of these materials typically is from about 0.01 to about 30 percent by weight of the ink, and preferably from about 0.05 to about 15 percent by weight of the ink, although the amount can be outside these ranges.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

One preferred additive to the inks of the present invention is a polymeric additive consisting of two polyalkylene oxide chains bound to a central bisphenol-A moiety. This additive is of the formula

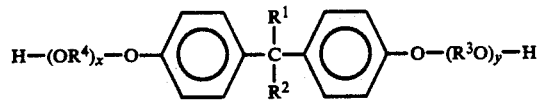

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science-Rev. Macromol. Chem. Phys.*, C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in copending application U.S. Ser. No. 07/738,021, entitled "Ink Compositions for Ink Jet Printing," with the named inventor William M. Schwarz, filed Jul. 30, 1991, the disclosure of which is totally incorporated herein by reference.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 3.0 centipoise, although the value can be outside these ranges. In addition, the surface tension of the ink compositions of the present invention generally is suitable for use in thermal ink jet printing processes. Typically the surface tension is from about 30 to about 55 dynes per centimeter, and preferably from about 35 to about 48 dynes per centimeter, although the value can be outside these ranges.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the ink additive of the present invention to the mixture and mixing at room temperature with moderate shaking until a homogeneous mixture is obtained, typically from about 5 to about 10 minutes. Alternatively, the ink additive of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions were prepared with the following contents by heating and stirring the ingredients for two hours at 50° C. followed by cooling to room temperature and filtering through a disposable 0.45 micron cellulose acetate filter (obtained from Nalga Co., Rochester, N.Y.): 2.5 percent by weight Direct Black 168 dye (obtained from Hoechst, Willowdale, Ontario), 0.5 percent by weight Projet Cyan dye (obtained from ICI, Manchester, United Kingdom), 0.03 percent by weight of a polyethylene oxide/bisphenol-A polymer of the formula

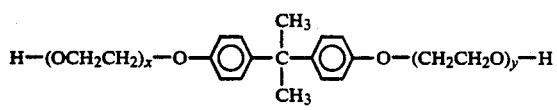

with a molecular weight of 18,500, obtained from Polysciences, Warrington, PA), ethylene glycol in the amount shown in the table below, Alkaminox T-12 in the amount shown in the table below, and deionized water in an amount such that the total amounts of the ingredients add up to 100 percent for each ink. The surface tension (Y, milliNewtons per meter (dynes per centimeter)), viscosity ($\eta$, centipoise), drying time (seconds) and line width (microns) of images printed with the ink on Hammermill Fore DP paper (obtained from Hammermill Paper Co., Erie, PA), and drying time (seconds) and line width (microns) of images printed with the ink on Classic Crest paper (obtained from Kimberley-Clark, Inc., Neenah, WI) when the inks were printed on paper from a Hewlett-Packard Deskjet printer were as follows:

| % T-12 | % Ethylene Glycol | Y | $\eta$ | Dry Time (Hammermill) | Line Width (Hammermill) | Dry Time (Classic Crest) | Line Width (Classic Crest) |
|---|---|---|---|---|---|---|---|
| 0.01 | 15 | 51.0 | 1.71 | 11 | 351 | 62 | 300 |
| 0.01 | 20 | 51.2 | 1.87 | 14 | 351 | 44 | 298 |
| 0.19 | 15 | 47.2 | 1.66 | 7 | 263 | 41 | 280 |
| 0.19 | 20 | 47.3 | 1.92 | 16 | 285 | 41 | 262 |
| 1.0 | 15 | 44.0 | 1.81 | 6 | 266 | 42 | 271 |
| 1.0 | 20 | 46.0 | 1.96 | 7 | 277 | 31 | 279 |
| 4.2 | 15 | 41.4 | 2.24 | 1 | 277 | 28 | 253 |
| 4.2 | 20 | 40.9 | 2.46 | 1 | 286 | 25 | 266 |

| % T-12 | % Ethylene Glycol | Line Width Error (microns) (Hammermill) | Line Width Error (microns) (Classic Crest) | Average Line Width Error |
|---|---|---|---|---|
| 0.01 | 15 | 18.7 | 11.6 | 15.2 |
| 0.01 | 20 | 18.4 | 13.4 | 15.9 |
| 0.19 | 15 | 16.6 | 14.8 | 15.7 |
| 0.19 | 20 | 14.4 | 13.6 | 14.0 |
| 1.0 | 15 | 19.3 | 19.0 | 19.2 |
| 1.0 | 20 | 17.1 | 14.7 | 15.9 |
| 4.2 | 15 | 29.8 | 18.8 | 24.3 |
| 4.2 | 20 | 30.0 | 23.8 | 26.9 |

Line width error measured for 3 pixel line

For comparison purposes, a commercial ink (Canon BJ-10e, obtained from Canon, Inc., Tokyo, Japan) was also incorporated into a Hewlett-Packard Deskjet printer and printed onto Hammermill Fore DP paper and Classic Crest paper with the following results:

| Y | $\eta$ | Dry Time (Hammermill) | Line Width (Hammermill) | Dry Time (Classic Crest) | Line Width (Classic Crest) |
|---|---|---|---|---|---|
| 34.0 | 1.55 | 1 | 308 | 331 | 284 |

| Line Width Error (microns) (Hammermill) | Line Width Error (microns) (Classic Crest) | Average Line Width Error |
|---|---|---|
| 17.8 | 15.2 | 16.5 |

Line width error measured for 3 pixel line

As the results indicate, many inks of the present invention exhibited improved print quality compared to the commercial ink.

EXAMPLE II

Ink compositions were prepared with the following contents by heating and stirring the ingredients for two hours at 50° C. followed by cooling to room temperature and filtering through a disposable 0.45 micron cellulose acetate filter (obtained from Nalga Co., Rochester, N.Y.): 2.5 percent by weight Direct Black 168 dye (obtained from Hoechst, Willowdale, Ontario), 0.5 percent by weight Projet Cyan dye (obtained from ICI, Manchester, United Kingdom), 0.03 percent by weight Carbowax M20 (obtained from Union Carbide Corporation, Danbury, CT), ethylene glycol in the amount shown in the table below, Alkamuls PSMO-20 in the amount shown in the table below, and deionized water in an amount such that the total amounts of the ingredients add up to 100 percent for each ink. The surface tension (Y, milliNewtons per meter (dynes per centimeter)), viscosity ($\eta$, centipoise), drying time (seconds) and line width (microns) of images printed with the ink on Hammermill Fore DP paper (obtained from Hammermill Paper Co., Erie, PA), and drying time (seconds) and line width (microns) of images printed with the ink on Classic Crest paper (obtained from Kimberley-Clark, Inc., Neenah, WI) when the inks were printed on paper from a Hewlett-Packard Deskjet printer were as follows:

| % PSMO-20 | % Ethylene Glycol | Y | $\eta$ | Dry Time (Hammermill) | Line Width (Hammermill) | Dry Time (Classic Crest) | Line Width (Classic Crest) |
|---|---|---|---|---|---|---|---|
| 0.01 | 15 | 51.8 | 1.65 | 10 | 272 | 50 | 282 |
| 0.01 | 20 | 51.2 | 1.91 | 14 | 287 | 45 | 289 |
| 0.13 | 15 | 44.4 | 1.69 | 13 | 317 | 48 | 327 |
| 0.13 | 20 | 42.9 | 1.92 | 7 | 302 | 41 | 313 |
| 1.39 | 15 | 39.8 | 1.81 | 9 | 260 | 44 | 267 |
| 1.39 | 20 | 40.5 | 2.09 | 5 | 275 | 31 | 271 |

| % PSMO-20 | % Ethylene Glycol | Line Width Error (microns) (Hammermill) | Line Width Error (microns) (Classic Crest) | Average Line Width Error |
|---|---|---|---|---|
| 0.01 | 15 | 20.2 | 15.3 | 17.8 |
| 0.01 | 20 | 14.7 | 14.0 | 14.4 |
| 0.13 | 15 | 16.0 | 13.7 | 14.9 |
| 0.13 | 20 | 15.1 | 15.5 | 15.3 |
| 1.39 | 15 | 15.7 | 14.1 | 14.9 |
| 1.39 | 20 | 20.9 | 15.0 | 18.5 |

Line width error measured for 3 pixel line

As the results indicate, many inks of the present invention exhibited improved print quality compared to the commercial ink shown in Example I.

In addition, these results indicate that the inks containing the sorbitan monoester ethoxylate exhibited a nearly constant line width error over variations in surface tension, whereas the inks containing the amine ethoxylate exhibited a trend of improved linewidth error with increasing surface tension.

EXAMPLE III

An ink composition was prepared with the following contents by heating and stirring the ingredients for two hours at 50° C. followed by cooling to room temperature and filtering through a disposable 0.45 micron cellulose acetate filter (obtained from Nalga Co., Rochester, N.Y.): 3.0 percent by weight Food Black #2 dye (obtained from Bayer Canada Inc., Montreal, Quebec), 15.0 percent by weight Liponic EG-7 (obtained from LiPo Chemicals, Inc., Paterson, N.J.), 0.03 percent by weight of Carbowax M20 (obtained from Union Carbide Corporation, Danbury, CT), and 81.97 percent by weight deionized water. The pH of the ink was adjusted to about 8.4 by the addition of 1 Normal hydrochloric acid. This ink exhibited a viscosity of 2.04 centipoise and a surface tension of 49.3 dynes per centimeter. The latency of this ink was found to be 10 seconds at 15 percent relative humidity. Latency was determined with a test fixture that enables determination of the jettability of an ink in a printhead under controlled humidity conditions. Latency is reported in terms of "first drop latency", i.e., the longest delay time after which the printhead can still emit a drop with a velocity of 5 meters per second without the need for priming the printhead and without missing a drop.

For comparison purposes, a similar ink was prepared except that ethylene glycol was substituted for Liponic EG-7. The pH of the ink was adjusted to about 8.0 by the addition of 1 Normal hydrochloric acid. This ink exhibited a viscosity of 1.55 centipoise and a surface tension of 55.2 milliNewtons per meter (dynes per centimeter). The latency of this ink was found to be 75 seconds at 15 percent relative humidity.

Both inks were incorporated into a Hewlett-Packard DeskJet printer and images of excellent print quality were formed on plain paper.

These results indicate that an ink containing an alkylene oxide adduct of glycerin generates prints comparable to those containing conventional ink jet ink components such as ethylene glycol.

EXAMPLE IV

An ink composition was prepared with the following contents by heating and stirring the ingredients for two hours at 50° C. followed by cooling to room temperature and filtering through a disposable 0.45 micron cellulose acetate filter (obtained from Nalga Co., Rochester, N.Y.): 30 percent by weight of a solution containing 10 percent by weight Sumitomo Direct Black 168 dye (obtained from Sumitomo Chemical Co. Ltd., Osaka, Japan), 5.0 percent by weight Liponic EG-7 (obtained from LiPo Chemicals, Inc., Paterson, N.J.), 10 percent by weight ethylene glycol, 0.03 percent by weight of polyethylene oxide with a molecular weight of 18,500 (obtained from Polysciences, Warrington, PA), 0.03 percent by weight Dowicil 200 biocide (obtained from Chemroy Canada Inc., Mississauga, Ontario), and 49.94 percent by weight deionized water. The pH of the ink was adjusted to about 8.78 by the addition of 1 Normal hydrochloric acid. This ink exhibited a viscosity of 1.82 centipoise and a surface tension of 48.8 dynes per centimeter. The latency of this ink was found to be 35 seconds at 15 percent relative humidity.

For comparison purposes, a similar ink was prepared except that it contained 15 percent by weight ethylene glycol and no Liponic EG-7. The pH of the ink was adjusted to about 8.5 by the addition of 1 Normal hydrochloric acid. The latency of this ink was found to be 40 seconds at 15 percent relative humidity.

Both inks were incorporated into a Hewlett-Packard DeskJet printer and images of excellent print quality were formed on plain paper.

These results indicate that an ink containing an alkylene oxide adduct of glycerin generates prints comparable to those containing conventional ink jet ink components such as ethylene glycol.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises an aqueous liquid vehicle, a colorant, and an additive material selected from the group consisting of sorbitan monoester alkoxylates of the formula:

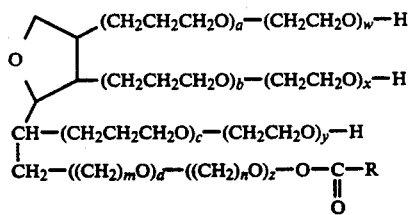

wherein the sum of $w+x+y+z$ is from about 10 to about 25, the sum of $a+b+c+d$ is from 0 to 12, with being less than 3, b being less than 3, c being less than 3, and d being less than 3, m is 2 or 3, and n is 2 or 3, with the sum of $m+n$ being no more than 5, wherein the ratio of w segments to a segments, the ratio of x segments to b segments, the ratio of y segments to c segments, and the ratio of z segments to d segments are each from 100:0 to about 50:50, and wherein R is an alkyl group.

2. An ink composition according to claim 1 wherein R is an alkyl group with from about 1 to about 18 carbon atoms.

3. An ink composition according to claim 1 wherein $w+x+y+z=20$, $a=0$, $b=0$, $c=0$, $d=0$, and R is an alkyl group with from about 4 to about 18 carbon atoms.

4. An ink composition according to claim 1 wherein the sorbitan monoester alkoxylate is present in the ink in an amount of from about 0.01 to about 2 percent by weight.

5. An ink composition according to claim 1 wherein the ink also contains ethylene glycol in an amount of from about 10 to about 25 percent by weight.

* * * * *